US008898191B2

United States Patent
Kass (10) Patent No.: US 8,898,191 B2
(45) Date of Patent: Nov. 25, 2014

(54) METHOD FOR PROVIDING CONNECTIONS FOR APPLICATION PROCESSES TO A DATABASE SERVER

(75) Inventor: Eric R. Kass, Mannheim (DE)

(73) Assignee: International Business Machines Corporation, Armonk, NY (US)

(*) Notice: Subject to any disclaimer, the term of this patent is extended or adjusted under 35 U.S.C. 154(b) by 511 days.

(21) Appl. No.: 12/970,513

(22) Filed: Dec. 16, 2010

(65) Prior Publication Data

US 2011/0153581 A1    Jun. 23, 2011

(51) Int. Cl.
G06F 17/30    (2006.01)

(52) U.S. Cl.
CPC .............................. *G06F 17/30566* (2013.01)
USPC ........................................................ 707/781

(58) Field of Classification Search
USPC ................................................. 707/705, 704
See application file for complete search history.

(56) References Cited

U.S. PATENT DOCUMENTS

| | | | |
|---|---|---|---|
| 6,105,067 A | | 8/2000 | Batra |
| 6,839,732 B1 | | 1/2005 | Vincent et al. |
| 2004/0215733 A1* | 10/2004 | Gondhalekar et al. ........ | 709/207 |
| 2004/0221059 A1* | 11/2004 | Bush ............................. | 709/238 |
| 2005/0086342 A1* | 4/2005 | Burt et al. ..................... | 709/224 |

OTHER PUBLICATIONS

Private Communication from Patrick Benson, PMP of Flagstaff, AZ, dated Jun. 6, 2012.
Patrick M. Benson, "Perl as a System Glue," Conference Paper, O'Reilly Perl Conference, 1997.
Patrick M. Benson, "Perl as a System Glue," PowerPoint Presentation, O'Reilly Perl Conference, 1997.
Patrick M. Benson, "OASIS, the Web Based Client-Server Fixed Assets System," Indiana University 1998 WebDevShare Conference, 1998.
Patrick M. Benson, "OASIS, a Web Based Fixed Assets System," PowerPoint Presentation, Indiana University 1998 WebDevShare Conference, 1998.
Patrick M. Benson, "OASIS—A Web Based Fixed Assets System," CAUSE 1998 Conference, PowerPoint Presentation, 1998.
Patrick M. Benson, "Performance Driven Design Issues in Web Development," Indiana University 1999 WebDevShare Conference, PowerPoint Presentation, 1999.
"Class ConnectionPool", accessed on Apr. 18, 2013 at <http://www.docjar.com/docs/api/edu/emory/mathcs/util/net/ConnectionPool.html>.

* cited by examiner

*Primary Examiner* — Syed Hasan
(74) *Attorney, Agent, or Firm* — Matthew J. Bussan (57) ABSTRACT

The invention relates to a method for providing connections for application processes to a database server. Each application process is allocated a virtualizing driver. The method comprises an application process requiring a connection to a database server and a virtualizing driver providing a virtual database connection interface to the application. Furthermore, the method comprises a database connection pool server brokering a real database connection to said application process.

14 Claims, 5 Drawing Sheets

METHOD FOR PROVIDING CONNECTIONS FOR APPLICATION PROCESSES TO A DATABASE SERVER

BACKGROUND

1. Field of the Invention

The present invention relates to the field of pooled database server systems. More specifically, the present invention provides a method for providing connections for application processes to a database server.

2. Description of the Related Art

Pooled database server systems often utilize three tier architectures. In three tier architectures, many hundreds of clients can make requests to a limited number of application servers which distribute database access across many database connections to one central database host. Application server designs where processes are multi-threaded in nature have an inherent ability to share database connections between the processing entities by means of intra-process database connection pooling, also referred to as intra-process (threaded) pooled database connections.

To handle many multiples of data-processing requests, most application servers operate according to a multiprocessing model. Two basic multiprocessing paradigms exist: parallel processing shares all resources (multi-threaded), or parallel processing shares no resources (multi-process). In a multi-threaded configuration, all parallel threads operate within one address space; thus all resources are available to all threads. In a multi-process configuration, each parallel process runs in a separate isolated address space; thus resource sharing requires an active exchange mechanism.

The state-of-the-art implantation of sharing (pooling) database connections amongst threads is therefore trivial; as the sharing occurs within one process. This invention describes a mechanism of sharing database connections in the non-trivial multiple process model.

In the multiple process model, pooled database connections can also be shared amongst different applications running on the same host, whereas state-of-the-art pooled database connections are only shareable within one application, namely the application running in the process.

The problem is that each database connection potentially causes heavy strain on the database server because resources required per connection are large. When the workload distribution design of the application server is application process oriented rather than thread oriented, it becomes difficult to share the database connections among the processing entities.

In the past, several attempts have been made to solve this problem. U.S. Pat. No. 6,105,067 describes a connection pool management for backend servers using a common interface. The system comprises an application server, one or more backend data servers, a connection pool, and a number of sub-processes for performing steps of the connection pool management. This reduces the overhead required for accessing the data servers.

Another solution to the problem is disclosed on "http://www.dcl.mathcs.emory.edu/downloads/h2o/doc/api/edu/emory/mathcs/util/net/ConnectionPool.html". Therein is described an implementation of a connection pool class that manages a pool of socket connections to a single network endpoint within a single process. The connection pool creates new connections if none is available and until a pool size limit is reached. The endpoint is represented by a host name and a port number. A client requests connections, uses them, then returns them to the pool. Upon a request for connection, the pool first tries to return a pre-existing idle one, creating a new connection only if none is available. Request may block if pool size limit is reached and all connections are in use. After being returned to the pool, if connection idles for longer than its expiration timeout, it is closed. The connection pool resides in the same address and process space as the application. Application code explicitly interacts with the connection pool by calling specific interfaces provided by the connection pool.

Lastly, U.S. Pat. No. 6,839,732 describes the use of domain socket pairs in communication for tightly coupled transactions. A gateway provides this communication to a server hosting a database management system. Logical agents represent the application connection and are managed by a logical agent scheduler and are passed within the gateway using domain socket pairs.

Most of these state of the art documents have the disadvantage that the applications need to be aware of the pool and need to be specifically designed be compatible with data pool servers. A further problem arises with the above mentioned state of the art documents. In certain cases, such as a SAP application server, database connections must be reserved prior to use. This is necessary to reduce deadlocks due to other activity of the application server.

SUMMARY

The present invention provides a database pooling system, wherein connections may be reserved and applications need not be aware of the pooling.

Accordingly, the present invention achieves this by the claimed method for providing connections for application processes to a database server. Each application process is allocated a virtualizing driver. The method comprises an application process requiring a connection to a database server and a virtualizing driver providing a virtual database connection interface to the application. Furthermore, the method comprises a database connection pool server brokering in coordination with the virtualizing driver a real database connection to said application process. For that the virtualizing driver is determining points in time when to require a real database connection from the database connection pool server possibly by monitoring database communication.

The above claimed method allows the use of applications that do not need to be specifically designed to be compatible with data pool servers. With the above method, the application processes need not be aware that pooling is happing. This is accomplished by the virtualizing drivers who represent to the application process a virtual database connection interface. The application process therefore believes that it has a real connection to the database.

In a further embodiment of the claimed method, the step of requiring a connection to a database server comprises requiring the connection to a database server for a later point in time.

Allowing for an application process to require a connection for a later point in time is the same as reserving a connection. This in turn reduces deadlock due to other activity of the application server.

In a further embodiment of the claimed method, the method further comprises the virtualizing driver determining, when the real connection is needed according to predefined rules. The virtualizing driver may use predefined or configured conditions to determine when a connection is needed (e.g. beginning of a database transaction, or at the beginning of an application transaction). The predefined rules could be based on transaction boundary, connection utilisation, duration of activity or a combination thereof.

In a further embodiment of the claimed method, the method further comprises the virtualizing driver determining, when the real connection is not needed any more and the virtualizing driver returning the connection to the database connection pool server. The virtualizing driver may use pre-defined or configured conditions to determine when a connection is no longer needed (e.g. at the completion of a database transaction, at the completion of an application transaction, or when the connection is not utilized).

In a further embodiment of the claimed method, the method further comprises that virtualizing driver provide an interface to the application allowing the application to indicate to the virtualizing driver that a real connection is needed (i.e. to allow an application process to require a connection for a later point in time) or not needed anymore (i.e. to allow an application process to release a connection that it had required for an earlier point in time).

In a further embodiment of the claimed method, the virtualizing driver shares an address space with the application process.

In a further embodiment of the claimed method, the database connection pool server has an independent address space from both the application processes and the database server.

In a further embodiment of the claimed method, the virtualizing driver communicates with the database connection pool server using operating system means for inter-process communication (sockets, remote procedure calls (RPC).

In a further embodiment of the claimed method, the database connection is a socket. The database connection socket is transferred between the virtualizing driver and the pool server using underlying operating system means to transfer sockets between processes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

BRIEF DESCRIPTION OF THE DRAWINGS

Embodiments of the invention are illustrated in the accompanied figures. These embodiments are merely exemplary, i.e. they are not intended to limit the content and scope of the appended claims.

DETAILED DESCRIPTION

Figure 1:
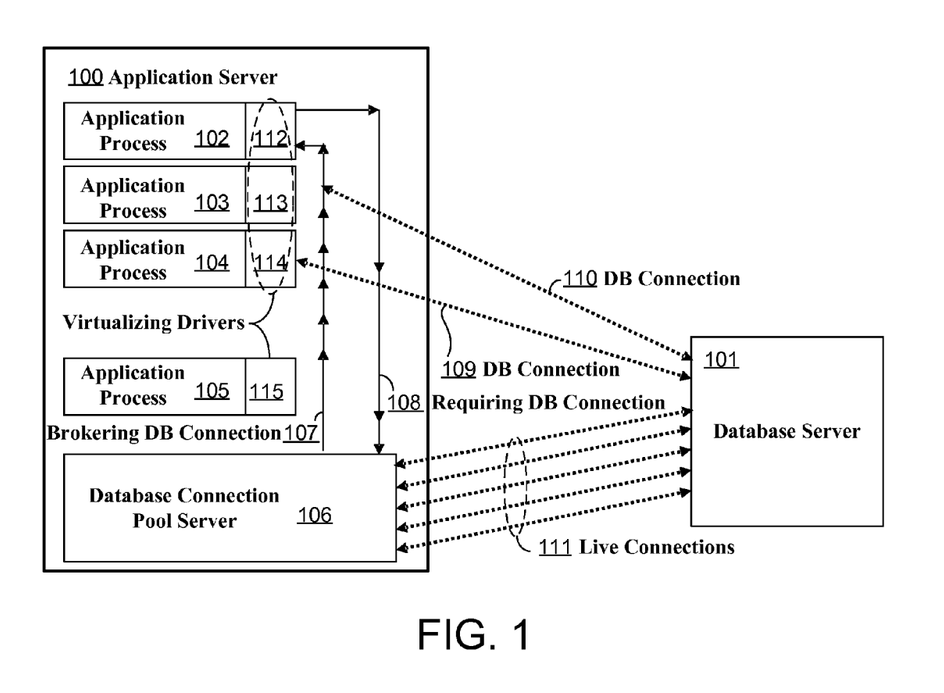
FIG. 1 shows an application of the claimed method on a database server system.

Shown in FIG. 1 is a database server system with a number of application processes 102, 103, 104, 105 running on an application server 100. Each application process 102 to 105 shares an address space with a virtualizing driver 112 to 115. Also on the application server 100 is a database connection pool server 106. The database connection pool server 106 holds a number of live connections 111 to a database server 101.

As the database connection pool server 106 resides on the same application server 100 as the virtualizing drivers 112 to 115 an additional layer of trust may not be required between the database connection pool server 106 and the virtualizing drivers 112 to 115 with which it communicates. The virtualizing drivers 112 to 115 do not need to authenticate themselves with the database connection pool server 106.

In other embodiments, virtualizing drivers 112 to 115 could authenticate themselves with the database connection pool server 106. As a conceivable example see the following:
1. virtualizing drivers 112 to 115 sends the user name and password used to connect to the database instance during connection establishment.
2. the database connection pool server 106 can verify that the operating system process user of the requesting virtualizing drivers 112 to 115 is allowed.
3. after initial authentication, further communications between the database connection pool server 106 and virtualizing drivers 112 to 115 might contain additional information proving prior successful authentication (e.g. token, signed nonce, etc.)

Referring again to FIG. 1, application 102 requires a connection to the database server 101. Application 102 has previously communicated 108 with the database connection pool server 106 about the need of a connection to the database server 101. As a result, the database connection pool server 106 is in the process of passing 107 the endpoint of a connection 110 to the database server 101 to the application process 102. When the virtualizing driver 112 of application process 102 determines that the application process 102 does not require the connection 110 anymore, then the endpoint of the connection 110 will be passed 108 back to the database connection pool server 106.

Figure 2:
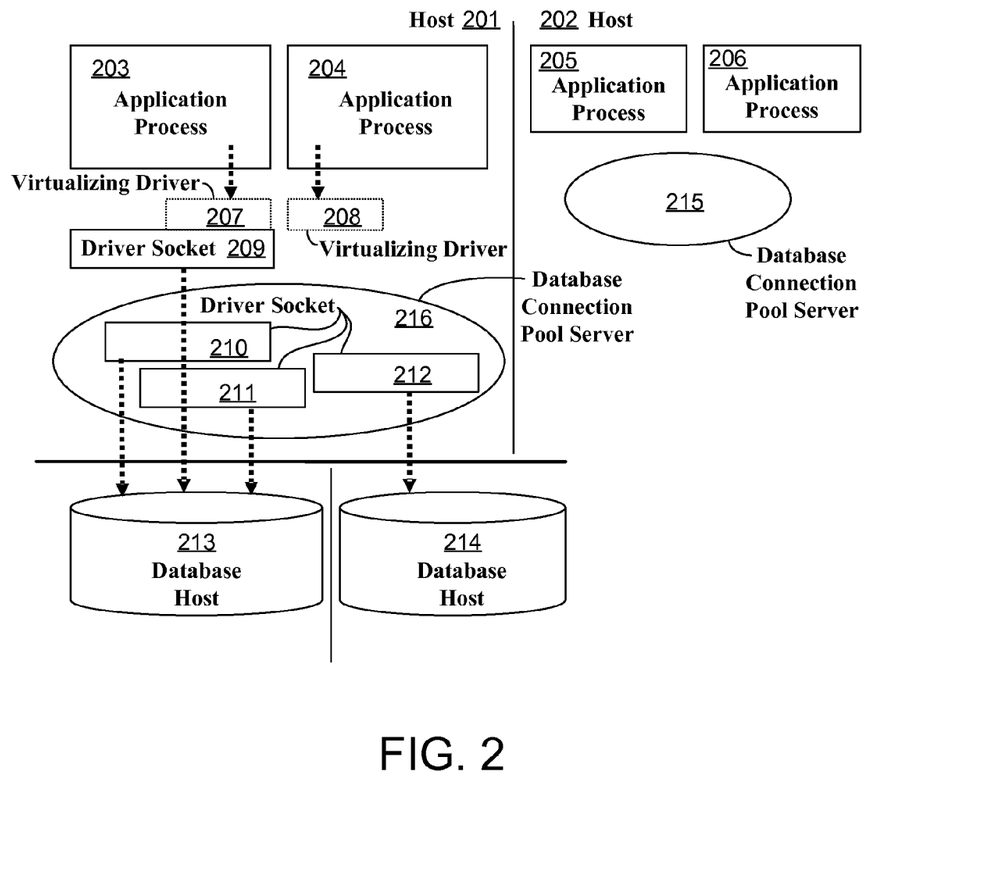
FIG. 2 shows an application of a further embodiment of the claimed method.

Shown in FIG. 2 is another embodiment of the claimed method. Depicted there is the intra-process driver level pooling between two applications processes 203 and 204. Both application processes 203 and 204 run on the host 201. The application process 203 is allocated the virtualizing driver 207, while the application process 204 is allocated the virtualizing driver 208. The virtualizing driver 207 has real connection to the database host 213 through the driver socket 209. This real connection is a direct connection between the application process 203 and the database host 213. The connection does not flow through the database connection pool server 218.

The virtualizing driver 208 provides the application process 204 with a virtual connection interface. The application 204 believes it is connected to the database host 213, but it is not. The virtualizing driver 208 determines when a real connection is needed and forwards a request to the database connection pool server 218. The database connection pool server 218 holds a number of live connections to the database host 213. When the request from the virtualizing driver 208 is received, the database connection pool server 218 brokers a real connection to the virtualizing driver 208 by forwarding a driver socket 210, 211, 212 to the virtualizing driver 208. Brokering of a real connection means here that the connection is distributed rapidly without the overhead of setting up a new connection. It is also possible for the application process 204 to reserve a driver socket 210, 211, 212 for a connection to the database host 213 for a later point in time. This would also be done through the virtualizing driver 208.

The database connection pool server 218 does not just hold driver sockets 210, 211 to connections to the database host 213. It also may hold driver sockets 212 to connection to other database host, such as database host 214. This enables the database connection pool server a control over the load balance and failover.

In the case of a connection failure, a message would be sent to the database connection pool server 218 either by the application processes 203, 204 that detected the failure or by a watchdog program monitoring the number of real database active database connections wherein the watchdog program is part of the database connection pool server 218. There are two possible recovery mechanisms for handling database connection failure which depend on the method of initial connection establishment:
a. the database connection pool server 218 handles initial connection establishment, when a virtualizing driver 207, 208 detects a database connection failure, it would notify the database connection pool server 218 that the particular connection has failed when returning a socket via SendSocket.
b. the virtualizing driver 207, 208 handles initial connection establishment; when a virtualizing driver 207, 208 detects a database connection failure, it simply re-establishes a new connection to the database host without the intervention of the database connection pool server 218.

In the case of application process failure, whereby a connection had been allocated to a virtualizing driver 207, 208 (lost connection) the following procedure commences:
1 the database connection pool server 218 may possess "watchdog" logic to detect failed processes owning established connections.
2 use a timeout as a criteria for assuming a connection has been lost.
3 query the database host 213 for established connections.

Figure 3:
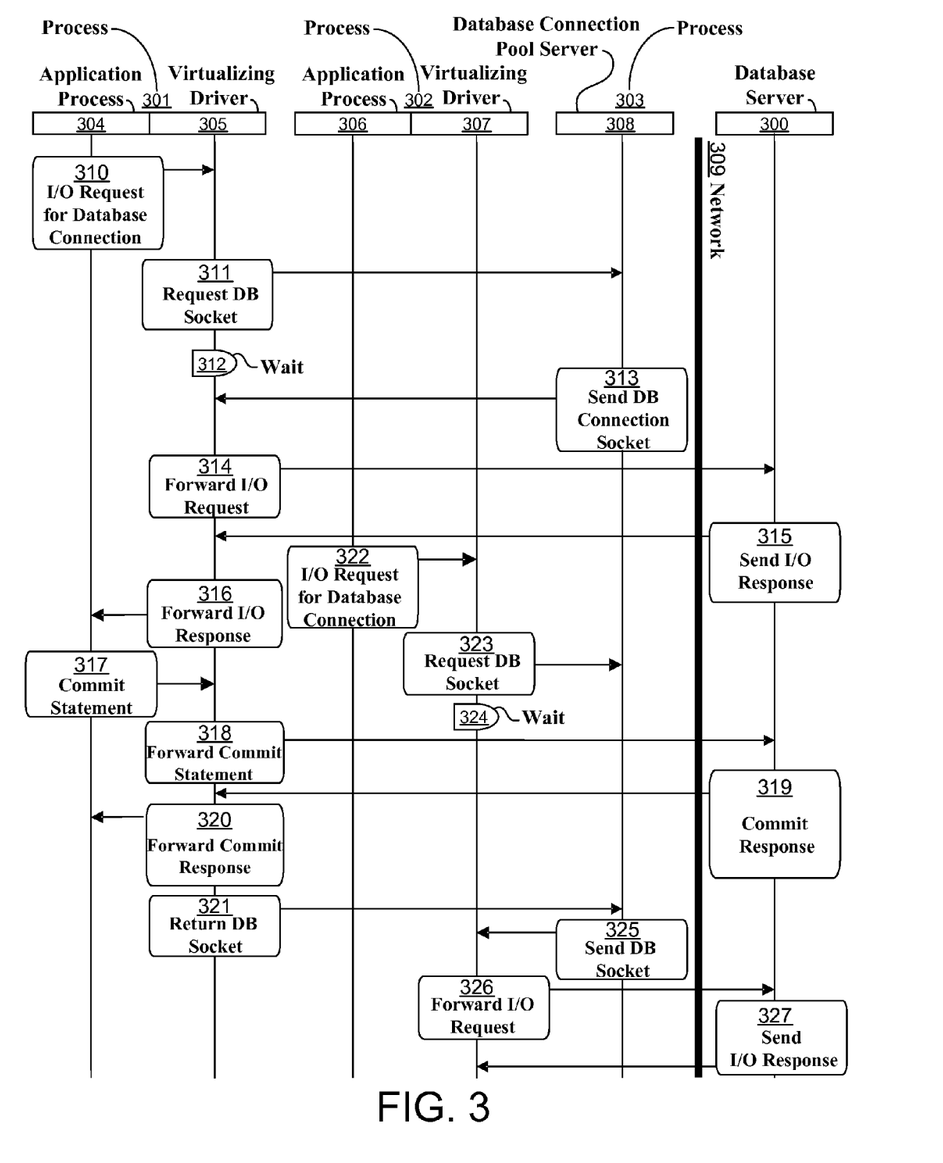
FIG. 3 shows a flow chart of the communication in the database system when the claimed method is applied.

Shown in FIG. 3 is a flow chart depicting a request and connection passing procedure of the claimed method. Shown in FIG. 3 is the process 301 which comprises the application process 304 and the virtualizing driver 305 of the application process 304. Process 2 302 comprises the application process 306 with the respective virtualizing driver 307. Process 303 is the database connection pool server 308. On the right of FIG. 3 are the network 309 and the database server 300. In step 310, the application 304 send an I/O request for a database connection to the virtualizing driver 305. In Step 311, the virtualizing driver 305 requests a socket from the database connection pool server 208. The virtualizing driver waits in step 312 until the database connection pool server 308 sends a database connection socket in step 313. In step 314, the virtualizing driver 305 forwards an I/O request over the network 309 to the database 300. In 315, the database 315 sends a I/O response to the virtualizing driver 305. In 316, the virtualizing driver 305 forwards the I/O response from the database 300 to the application process 304.

Meanwhile, application process 306 sends an I/O request for a database connection to the virtualizing driver 307 in step 322. In step 323, the virtualizing driver 307 requests a socket for a database connection from the database connections pool server 308. In step 324, the virtualizing driver waits for an answer. In the meantime, application process 304 sends a commit statement to the virtualizing driver 305 in step 317. In step 318, the virtualizing driver 305 forwards the commit statement to the database 300. In step 319, the database sends a commit response to the virtualizing driver 305, which the virtualizing driver 305 forwards to the application process 304 in step 320. As a result, the virtualizing driver returns the socket to the database connection pool server 308 in step 321. The database connection pool server uses the now free socket to answer the previous request 323 for a socket of the virtualizing driver 307 and sends that socket to the virtualizing driver 307 in step 325. In 326 the virtualizing driver 307 forwards an I/O request over the network 309 to the database 300. The database 300 sends an I/O response in step 327.

Figure 4:
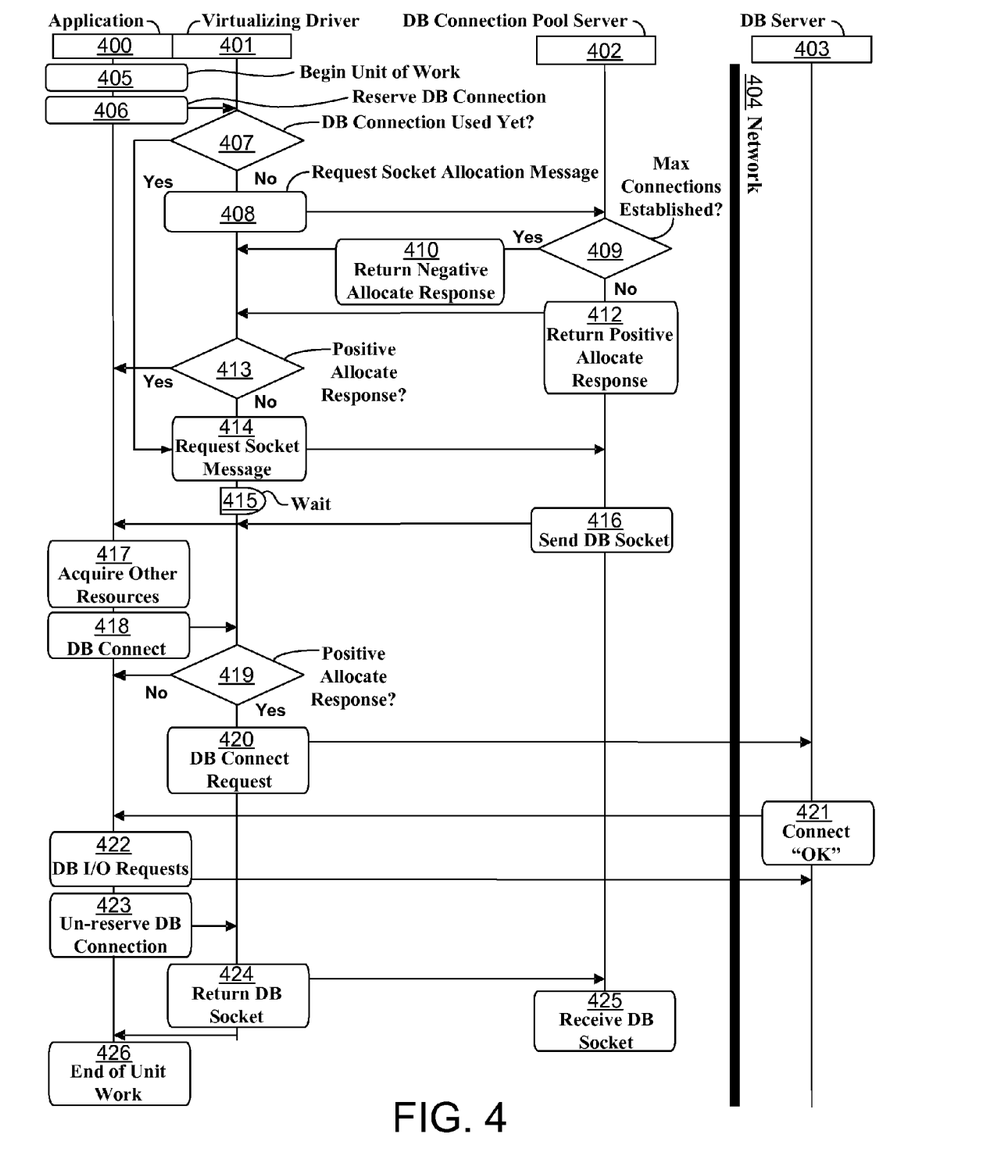
FIG. 4 shows a flow chart of a further embodiment of the method.

Shown in FIG. 4 is a flow chart depicting a database connection pre-reservation sequence. When sharing database connections amongst consumers, the number of actual connections (established sockets) is fewer than may be required at any point in time; thus, the database connection is a limited resource. An application will wait for database connection resource when there are an insufficient number of them. In combination with other resource contention, a lock enqueue server for one example, or a second database connection for a second example, an application may find itself in deadlock situation with another sharer of database connections.

An application can avoid deadlock situations by following a locking order. A defined locking order may require that a database connection resource be acquired before another resource or secondary database connection.

Referring back to FIG. 4, the first step is the reservation of a connection. An application 400 begins a unit of work 405 requiring a database connection and an application specific lock from an enqueue server. The application calls an API provided by the virtualizing driver 401 to reserve a database connection 406. In step 407, the virtualizing driver 401 determines whether the database connection referenced by the application 400 had not yet been used.

If the referenced connection had not been used, the virtualizing driver 401 sends a Request-Socket-Allocation message to the database connection Pool Server (DPS) in 408. In step 409, the data pool server 402 determines whether the maximum number of allowable connections had been established as determined by configuration.

If the maximum number of allowable connections has been reached, the database connection pool server 402 returns a Negative Allocate Response to the virtualizing driver in step 410. In step 413 the virtualizing driver 401 checks the response of 409. If response was negative, the virtualizing driver 401 sends a Request Socket message to the database connection pool server 402 at step 414 and waits at step 415 for an available socket to be returned by the database connection pool server at step 416. After the socket is obtained, the virtualizing driver returns control to the application.

If the maximum number of allowable connections had not yet been established in step 409, then the database pool connection server 402 returns a Positive Allocate Response to the virtualizing driver 401 in step 412. In step 413, the virtualizing driver checks the answer to 409, remembers this answer for later (ref 419) and returns control to the application.

If the step 407 was positive, i.e. the referenced connection had been used, then virtualizing driver 401 sends a Request-Socket message to the database connection pool server in step 414 and waits 415 for an available socket to be returned by the database connection pool server in step 416. After the socket is obtained, the virtualizing driver returns control to the application.

In step 417, the application requires subsequent resources. If the application had not issued a database connect API on the referenced connection, it will invoke a database connect API on the virtualizing driver before using the database connection for database access in step 418. If the DPS had previously responded with a Positive Allocate Response (ref 412 and 413), the virtualizing driver will issue a real database connect request to the database server in order to build up a new socket (connection endpoint) to the database server in step 420. If the DPS had previously responded with a Negative Allocate Response (ref 410 and 413), the virtualizing driver will return control back to the application immediately because a socket (connection endpoint) had already been acquired (ref 414 and 416).

Next the database activity is monitored. The application continues to process the unit of work thereby issuing database I/O requests at step 422. The application may also perform multiple units of work under a single database connection reservation; that is, if the application issues a database commit, the socket (connection endpoint) would not typically be returned to the database connection pool server. The socket would normally be held until the application completed unit (s) of work in 426 and then called an API provided by the database virtual driver to un-reserve the database connection at 423. The un-reserve would cause the virtualizing driver to return the socket (connection endpoint) back to the database connection pool server in step 424.

Figure 5:
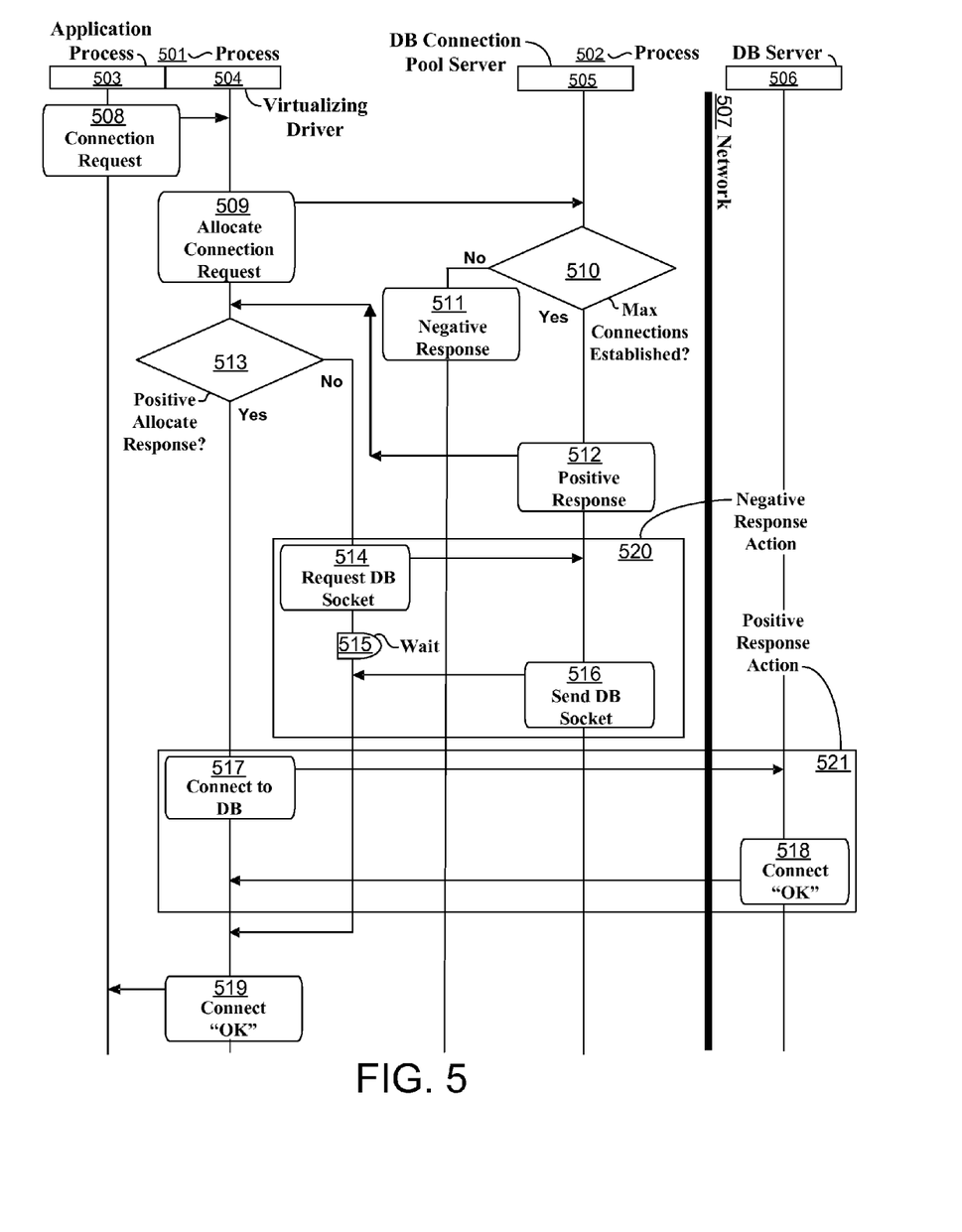
FIG. 5 shows a flow chart of a further embodiment of the method.

Shown in FIG. 5 is a flow chart of an exemplary embodiment of the claimed method depicting a virtualizing driver establishing a database connection. Process 501 comprises application process 503 and virtualizing driver 504. Process 502 comprises the database connection pool server 505. In 508 the application process 503 sends a connection request to the virtualizing driver 504. In 509 the virtualizing driver 504 allocates the connection request to the database connection pool server 505. In step 510, the database connection pool server checks if the maximum number of connections to the database have been established. If the response is negative 511, then the response is forwarded back to the virtualizing driver and the negative procedure 520 is initiated. The negative procedure comprises the virtualizing driver 504 sending a request for a database socket to the database connection pool server in 514, waiting for an answer in 515 and the database connection pool server 505 sending a socket in 516. If the answer to 510 is positive, that is if the maximum connection have been established, then the positive procedure 521 is initiated. The positive procedure 521 comprises the virtualizing driver 504 sending a connect request to the database in 517 and the database 506 answering in 518 with a connect "OK" response. The connection, either as a result of the positive or the negative procedure, is then forwarded by the virtualizing driver 504 to the application process 503 in step 519.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

REFERENCE SIGNS 100 application server
101 database server
102-105 application processes
106 database connection pool server
107 brokering database connection
108 requiring database connection
109-111 database connections
201 host A
202 host B
203-206 application processes
207-208 virtualizing drivers
209 real database connection
210-212 live database connections
213 database host A
214 database host B
215 database connection pool server host B
216 database connection pool server host A
300 database
301 process 1
302 process 2
303 process 3
304 application 1
305 virtualizing driver 1
306 application 2
307 virtualizing driver 2
308 database connection pool server
309 boarder to network
310 I/O request do DB
311 request DB socket
312 wait
313 send DB response
314 forward I/O request
315 send I/O response
316 forward I/O response
317 Commit to DB
318 forward Commit
319 send Commit response
320 forward Commit response
321 return database socket
322 I/O request do DB
323 request DB socket
324 wait
325 send DB response
326 forward I/O request
327 send I/O response
400 application
401 virtualizing driver
402 database connection pool server
403 database
404 network
405 begin unit of work
406 reserve database connection
407 virtual connected to database
408 allocate connection request
409 maximum connections established?
410 negative response
412 positive response
413 positive allocate response
414 request database socket
415 wait
416 send database socket
417 acquire other resources (e.g. enqueue)
418 database connect
419 positive allocate response
420 database connect
421 connect "OK"
422 request to database etc.
423 un-reserve database connection
424 return database socket
425 receive database socket
426 end of unit work
501 process 1
502 process 2
503 application 1
504 virtualizing driver 1
505 database connection pool server
506 database
507 network
508 connection request
509 allocate connect request
510 maximum connections established?
511 negative response
512 positive response
513 positive allocate response?
514 request DB socket
515 wait
516 send DB socket
517 connect to DB
518 connect OK
519 connect "OK"
520 negative response action
521 positive response action

The invention claimed is:

1. A method for providing connections for application processes to a database server, wherein each application process runs in a separate isolated address space with respect to the other application processes, the method comprising:
allocating virtualizing drivers to the application processes, wherein each application process is allocated a different one of the virtualizing drivers, and wherein each virtualizing driver shares an address space with the application process to which that virtualizing driver is allocated;
requiring a connection from a given one of the application processes to a database server;
providing to the given application process a virtual database connection interface via the virtualizing driver allocated to the given application process;
brokering, via a database connection pool server in coordination with the virtualizing driver allocated to the given application process, a real database connection to the given application process while the virtualizing driver allocated to the given application process determines points in time when to require a real database connection from the database connection pool server, wherein the database connection pool server holds a plurality of driver sockets each to a live connection to the database server, and wherein brokering a real database connection to the given application process includes the database connection pool server forwarding one of the driver sockets to the virtualizing driver allocated to the given application process.

2. The method according to claim 1, wherein the step of requiring a connection from a given one of the application processes to a database server comprises requiring the connection to a database server for a later point in time.

3. The method according to claim 1, wherein the method further comprises the step of:
   determining, via the virtualizing driver allocated to the given application process, when the real connection is needed according to predefined rules and when the real connection is not needed any more, the virtualizing driver allocated to the given application process returning then the connection to the database connection pool server.

4. The method according to claim 3, wherein the method further comprises the step of:
   providing to the virtualizing driver allocated to the given application process an interface to allow the given application process to indicate to the virtualizing driver allocated to the given application process that a real connection is needed or not.

5. The method according to claim 1, wherein the database connection pool server is a process, and wherein the database connection is a socket and is transferred between the virtualizing driver allocated to the given application process and the database connection pool server using an underlying operating system to transfer sockets between processes.

6. The method according to claim 1, wherein the database connection pool server has an independent address space from both the application processes and the database server.

7. A computer program product comprising a computer readable storage medium including computer usable program code, wherein the computer usable program code is adapted to execute the method of claim 1.

8. A computer system for providing application processes with connections to a database server, the computer system comprising
   an application server, the application server comprising a database connection pool server and a plurality of application processes, each of the application processes runs in a separate isolated address space with respect to the other application processes,
   wherein virtualizing drivers are allocated to the application processes, wherein each application process is allocated a different one of the virtualizing drivers, and wherein each virtualizing driver shares an address space with the application process to which that virtualizing driver is allocated,
   wherein a connection is required from a given one of the application processes to a database server,
   wherein the virtualizing driver allocated to the given application process provides to the given application process, a virtual database connection interface, and
   wherein the database connection pool server brokers a real database connection to the given application process in coordination with the virtualizing driver allocated to the given application process while the virtualizing driver allocated to the given application process determines points in time when to require a real database connection from the database connection pool server, wherein the database connection pool server holds a plurality of driver sockets each to a live connection to the database server, and wherein brokering a real database connection to the given application process includes the database connection pool server forwarding one of the driver sockets to the virtualizing driver allocated to the given application process.

9. The computer system according to claim 8, wherein the given application process further comprises requiring the connection to a database server for a later point in time.

10. The computer system according to claim 9, wherein the virtualizing driver allocated to the given application process comprises determining when the real connection is needed by the given application process according to predefined rules and when the real connection is not needed any more, the virtualizing driver allocated to the given application process returning then the connection to the database connection pool server.

11. The computer system according to claim 10, wherein the virtualizing driver allocated to the given application process provides an interface to allow the given application process to indicate to the virtualizing driver allocated to the given application process that a real connection is needed or not.

12. The computer system according to claim 8, wherein the database connection pool server is a process, and wherein the database connection is a socket and is transferred between the virtualizing driver allocated to the given application process and the database connection pool server using an underlying operating system to transfer sockets between processes.

13. The computer system according to claim 8, wherein database connection pool server has an independent address space from both the application processes and the database server.

14. A computer program product for providing application processes of a computer system with connections to a database server, the computer system comprising an application server, the application server comprising a database connection pool server and a plurality of application processes, each of the application processes runs in a separate isolated address space with respect to the other application processes, the computer program product comprising:
   program code provided on a computer readable storage medium, wherein the program code, when executed by at least one processor in the computer system, cause the computer system to perform the steps of:
   allocating virtualizing drivers to the application processes, wherein each application process is allocated a different one of the virtualizing drivers, and wherein each virtualizing driver shares an address space with the application process to which that virtualizing driver is allocated;
   requiring a connection from a given one of the application processes to the database server;
   providing to the given application process a virtual database connection interface via the virtualizing driver allocated to the given application process;
   brokering, via the database connection pool server in coordination with the virtualizing driver allocated to the given application process, a real database connection to the given application process while the virtualizing driver allocated to the given application process determines points in time when to require a real database connection from the database connection pool server, wherein the database connection pool server holds a plurality of driver sockets each to a live connection to the database server, and wherein brokering a real database connection to the given application process includes the database connection pool server forwarding one of the driver sockets to the virtualizing driver allocated to the given application process.

* * * * *